United States Patent
Kienzle et al.

(10) Patent No.: US 7,546,617 B1
(45) Date of Patent: Jun. 9, 2009

(54) CREDIT BASED MEDIA PRESENTATION

(75) Inventors: Martin G. Kienzle, Briarcliff Manor, NY (US); Raymond E. Rose, Jr., Purdys, NY (US); Olivier Verscheure, Long Island City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,675

(22) Filed: May 25, 2000

(51) Int. Cl.
*H04N 7/16* (2006.01)
*H04N 7/10* (2006.01)
*H04N 7/025* (2006.01)
*H04H 60/33* (2008.01)
*G06Q 30/00* (2006.01)
*G07G 1/14* (2006.01)

(52) U.S. Cl. .................... 725/23; 725/5; 725/8; 725/34; 705/14

(58) Field of Classification Search ............ 725/8, 725/23, 5, 24, 34; 705/14
See application file for complete search history.

(56) References Cited

U.S. PATENT DOCUMENTS

| 4,850,007 | A | | 7/1989 | Marino et al. |
| 4,961,109 | A | | 10/1990 | Tanaka |
| 4,975,951 | A | * | 12/1990 | Bennett ............ 380/231 |
| 5,619,247 | A | * | 4/1997 | Russo ............ 725/104 |
| 5,752,238 | A | | 5/1998 | Dedrick |
| 5,819,092 | A | | 10/1998 | Ferguson et al. |
| 5,838,314 | A | * | 11/1998 | Neel et al. ............ 725/8 |
| 6,057,872 | A | * | 5/2000 | Candelore ............ 725/23 |
| 6,546,555 | B1 | * | 4/2003 | Hjelsvold et al. ........... 725/1 |
| 7,340,759 | B1 | * | 3/2008 | Rodriguez ............ 725/8 |
| 2002/0083444 | A1 | * | 6/2002 | Blasko et al. ............ 725/35 |
| 2003/0133692 | A1 | * | 7/2003 | Hunter ............ 386/35 |

* cited by examiner

*Primary Examiner*—Joseph G Ustaris
(74) *Attorney, Agent, or Firm*—Ference & Associates LLC

(57) ABSTRACT

A method for monitoring and controlling the presentation of electronic media according to a credit-based scheme. "Debit-bearing" media may include video, audio, interactive software, etc. "Credit-bearing" media typically include commercials or banner ads. Other credit factors include cash, prizes, etc. The customer determines how to accumulate credits and how to spend them.

22 Claims, 4 Drawing Sheets

CREDIT BASED MEDIA PRESENTATION

FIELD OF THE INVENTION

The present invention relates generally to digital multimedia streams distribution, and more particularly to an apparatus and method to present such streams to a customer based upon a predetermined cost factor for media already presented.

BACKGROUND OF THE INVENTION

Commercial television and radio broadcasts are typically funded by advertisers who assume that the program content being broadcast will attract a certain number of viewers or listeners, who will then continue watching or listening as the advertisers' commercials are broadcast. This model has clear weaknesses, since there is no assurance that the audience are actually paying attention to the commercials. Large portions of the audience may have been mis-targeted and have no reason to buy the product being advertised. Additionally, they may not appreciate the implicit social contract of commercial-based broadcast, and resent commercials as an intrusion into their viewing/listening experience. However, this model has worked well enough to provide profits for broadcasters and advertisers, and as long as no means of improving upon it was available, it has persisted.

As video and audio streams in television switch to digital encoding, the home television setup will include a Set-Top Box (STB), which is a type of special-purpose computer designed to convert a digital data stream into the audio and video signals that make up a TV broadcast. It is also possible to install an adapter card in a computer to cause it to act as an STB. These data streams may also include data to be used by computer, or STB, applications. The computer or STB may also include a storage device, such as a disk, on which content can be recorded for later presentation.

As a result of this use of such a digital data stream and a computer or STB to process it, the traditional advertising-based TV model faces certain problems and opportunities. Among the problems are technology that makes it easy to automate the deletion of commercials from the media during presentation. Among the opportunities are the interactive capabilities of computers and STB's, which enable broadcasters and advertisers to target their advertising more efficiently. Another significant capability that generally accompanies digital TV systems is the capability for the receiving computer or STB to communicate with the content provider, either through a hardware backchannel (as in a cable system) or through the Internet.

A need has thus been recognized in conjunction with responding to the aforementioned opportunities.

SUMMARY OF THE INVENTION

The present invention, in accordance with at least one presently preferred embodiment, exploits the interactive capabilities of computers and STB's to provide a more cost-effective manner of targeting advertisements to prospective customers, compensating content providers for the value of their broadcast content, and giving consumers a choice as to how they wish to pay for their media experience. Specifically, all media delivered by the broadcaster are preferably assigned a value from the consumer's point of view. Entertainment or information content is assumed to have a positive value. The consumer is likely to exchange something of value for the privilege of experiencing it. Advertising content is assumed to have a negative value. The consumer expects to be compensated for the time spent experiencing it.

Consequently, the present invention broadly contemplates a method whereby a computer maintains an "account" of the positive- and negative-value content that has been presented to the consumer, and uses the balance in that account to determine the rules for future behavior of the presentation device.

In one aspect, the present invention provides an apparatus for regulating electronic media content, the apparatus comprising: an interface arrangement which receives media input; a controller which attributes at least one credit value to at least one portion of received media input; and a regulator which regulates the presentation of received media input at a presentation medium based on the at least one credit value attributed to the at least one portion of received media input.

In another aspect, the present invention provides a method of regulating electronic media content, the method comprising the steps of: receiving media input; attributing at least one credit value to at least one portion of received media input; and regulating the presentation of received media input at a presentation medium based on the at least one credit value attributed to the at least one portion of received media input.

In an additional aspect, the present invention provides a program storage device readable by machine, tangibly embodying a program of instructions executable by the machine to perform method steps for regulating electronic media content, the method comprising the steps of: receiving media input; attributing at least one credit value to at least one portion of received media input; and regulating the presentation of received media input at a presentation medium based on the at least one credit value attributed to the at least one portion of received media input.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
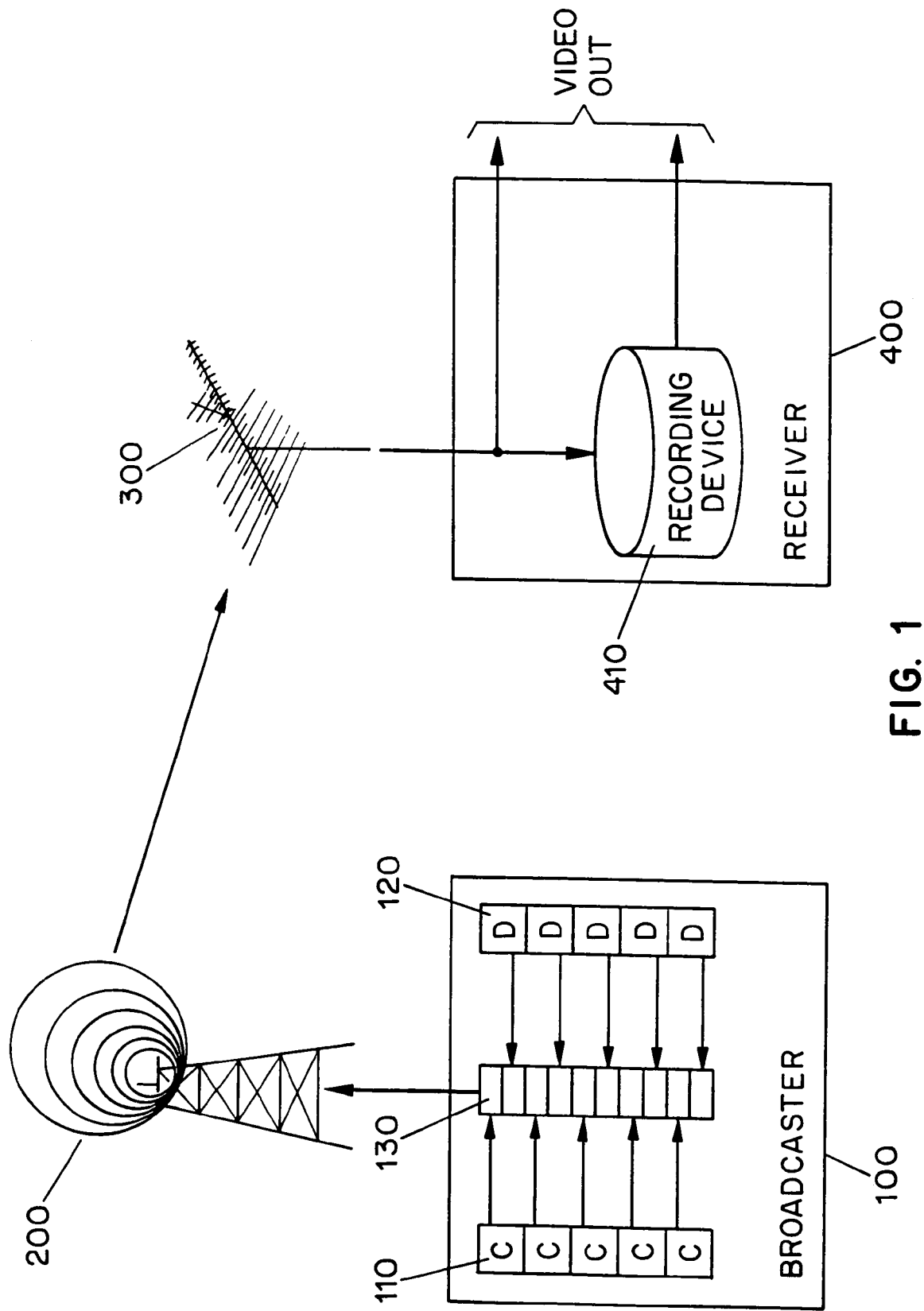
FIG. 1 schematically illustrates a process of gathering content at the broadcast site and transmitting it to the receiver.

As shown in FIG. 1, a television broadcast station has a mix of credit-bearing content 110, which may typically include commercials, and debit-bearing content 120, which may typically include entertainment or informational programming (e.g., sitcoms, news, sportscasts, etc.). Both types of content are combined into a stream 130, to be broadcast by the transmitter 200. If the technology permits (as when the transmission is in digital format), multiple pieces of content may be broadcast simultaneously. When the signal is received by the receiver 400, it may be sent to an output device immediately or stored on a recording device 410, such as a VCR or a digital recorder. During this entire process, no accounting of credits or debits is performed, since the media are not being presented.

Figure 2:
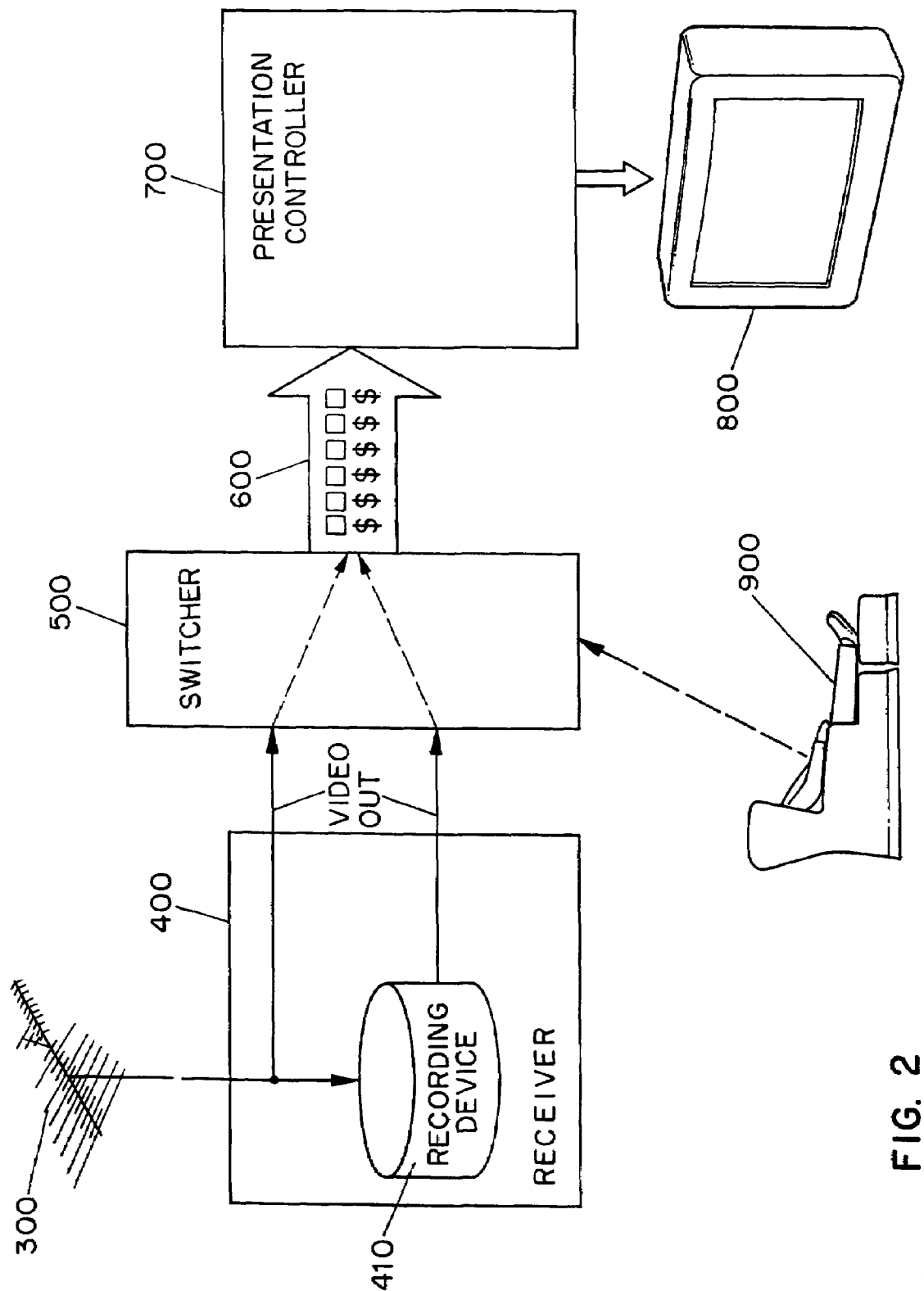
FIG. 2 schematically illustrates a process for selecting content to be presented.

As shown in FIG. 2, the content is streamed from the receiver to a presentation device. The selectable content includes broadcast channels being received through an antenna 300, or pre-recorded content 410. The person 900 viewing the content is able to choose either pre-recorded content or live content through a switcher 500 (e.g., by prompting the switcher via remote control). The selected content is streamed at 600, to the presentation controller 700, for presentation at, for example, a TV screen 800. A presentation controller 700 could be embodied, for example, by a set top box such as a cable converter box commonly encountered in U.S. cable TV systems, but with additional characteristics as described herein. Each piece of selected content preferably has a credit or debit value associated with it. A "piece" of content may be defined, for instance, as a TV show or segment thereof or as a single TV commercial, etc. A TV show, in this case, may be broken into segments of any size for the purpose of applying credits until they run out. The entire show may also be considered a single "piece" so that the credit determination would be made before presenting the show, thereby ensuring that the show would not be terminated at some intermediate point during its transmission.

Figure 3:
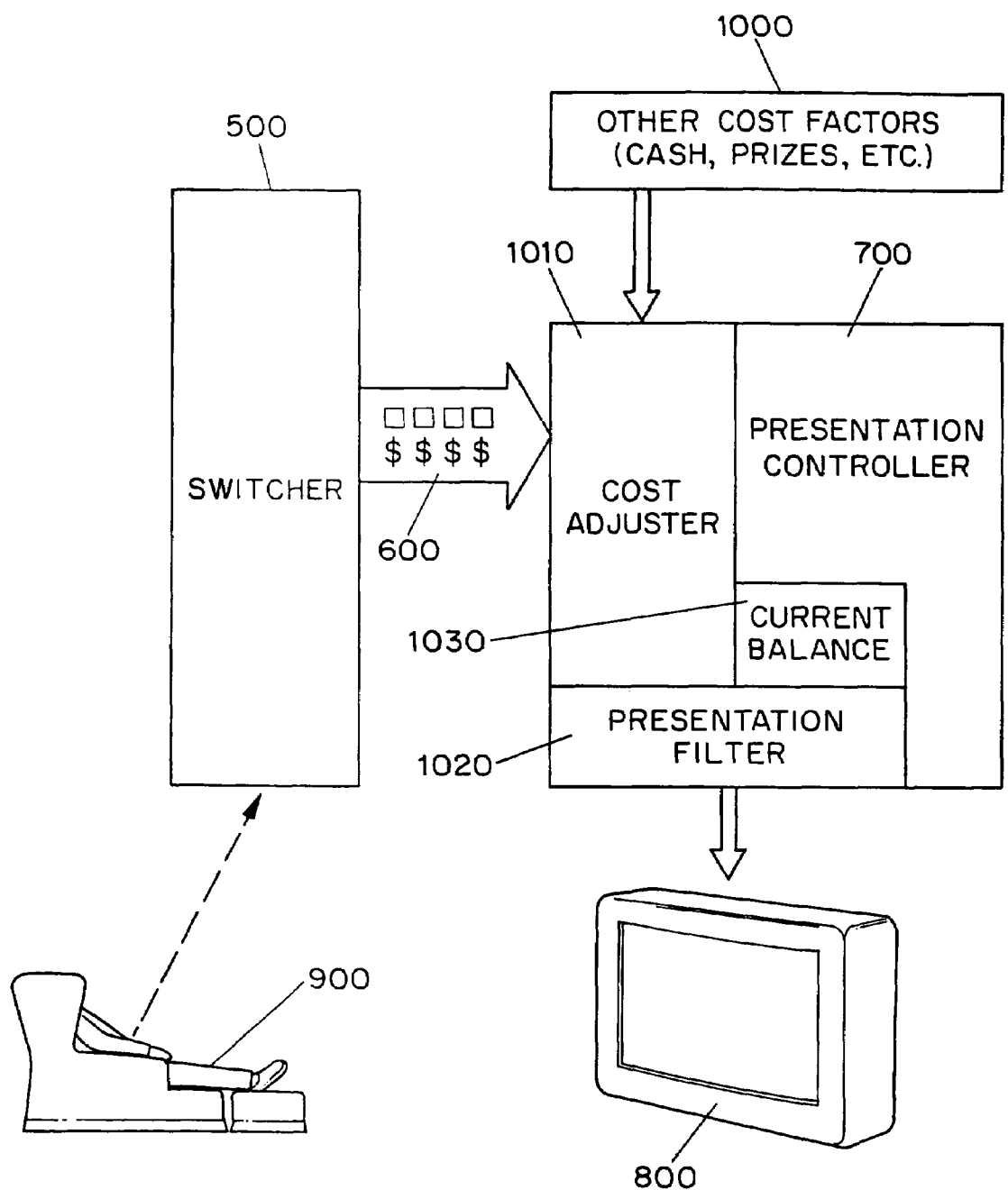
FIG. 3 schematically illustrates a mechanism for presenting and accounting for the content.

As shown in FIG. 3, the content selected by the viewer is preferably transmitted at 600, from the viewer-controlled switcher 500, to the presentation controller, 700. A cost adjuster 1010, in the presentation controller, preferably examines the cost factor data accompanying each piece of content to be presented. The cost adjuster 1010, particularly, preferably applies numerical values that accompany content as well as rules that cause the numeric cost factor to be influenced by the current context.

In one implementation of the present invention, the presentation controller 700 may be programmed with information about the viewer's demographic profile and preferences. Based upon that information, the cost adjuster could apply a higher credit value for advertisements that are more likely to be of interest to the viewer. For debit-bearing content, the cost adjuster may also influence the debit value associated with the content. For example, the debit value of a movie may be highest when it is first released, and then decline with the passage of time.

After the cost adjuster has produced a debit or credit factor for the content being presented, the current balance (indicated at 1030), is preferably updated accordingly. Finally, the presentation filter 1020 preferably examines the current balance and the credit/debit value of the content to be presented. The presentation filter 1020 will then act according to a set of rules determined by the broadcaster. In one implementation, the presentation filter 1020 may present visual or audio warnings to the viewer as the current balance begins to approach zero. If the viewer is not deemed sufficiently "creditworthy", the presentation filter may suspend all presentation of debit-bearing content when the current balance reaches zero. On the other hand, a viewer with a better "credit rating" may continue viewing content with a negative balance. Another possible set of rules may allow the viewer to view content in a degraded manner, thereby maintaining the viewer's interest while providing an incentive to obtain credits so as to be able to view the content without degradation.

To accommodate viewers who wish to obtain their credits without viewing advertisements, the presentation controller also accepts "other cost factors" 1000. These are preferably delivered to the presentation controller 700 by the broadcaster. They may include cash payments from the viewer, prizes from contests, or "free credits" as the result of various promotional campaigns.

The embodiments of the present invention are believed to be useful in essentially any application where multimedia content is to be delivered to an audience, and the content provider seeks compensation for delivering such content. Since the term "multimedia" encompasses types of content that are believed to hold a typical consumer's attention, we can assume that such consumers are good targets for advertising. Further, since the presence of a computer or STB is assumed, it is possible to store in such a device information about the consumer's demographics, preferences, and buying habits. In the implementation described here, the multimedia content takes the form of a television broadcast.

Figure 4:
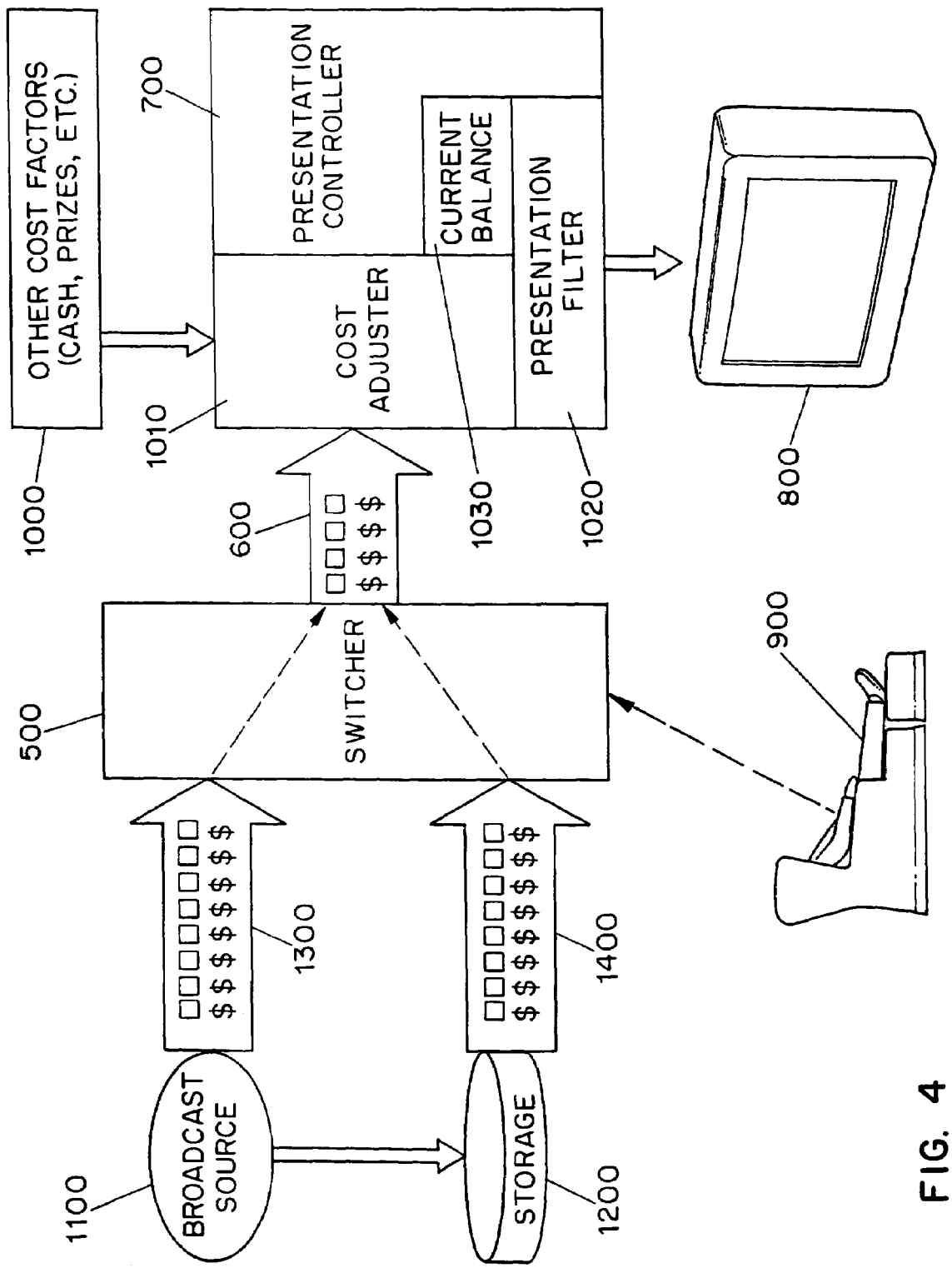
FIG. 4 schematically illustrates a generic implementation of an embodiment of the present invention.

FIG. 4 illustrates a system, in accordance with an embodiment of the present invention, for receiving and decoding content after it is received by terrestrial, cable, or satellite broadcast. (It should be noted that the embodiments of the present invention tend to focus upon the presentation of media to the consumer, and not the delivery of such media to the consumer's premises.) Therefore, the consumer is free to record any content on a recording device such as a VCR, and is not debited until the content is played on a television. In this instance, the content may originate from a broadcast source 1100, or a storage device such as a digital VCR 1200. The content may include essentially any mixture of debit- and credit-bearing segments. Each piece of content is preferably accompanied by digital information describing its relative value and rules for adjusting that value. The content is preferably transferred electronically (at 1300 and 1400) to a switching device 1500 controlled by the consumer 1000. This device determines which content to present at any given time. It then delivers it (at 600) to the presentation controller 700. The cost adjuster 1010 may preferably modify the cost factors that accompany the media. For example, repeated viewings of the same advertisement would have lower credit values than the first viewing. On the other hand, an advertisement being presented to a customer who is known to be in a demographic group that has a high probability of purchasing the advertised product would have a high credit value.

Preferably, the presentation filter 1020 monitors the current account value 1030 and may halt presentation of media on the TV 800, or may present it in a degraded form if the current account falls below a specified threshold. The content provider can control the behavior of the presentation filter 1020. Such behavior would be influenced primarily by the current balance 1030, which is continually being updated based upon the media being presented. The threshold used by the presentation filter 1020 need not be zero if the consumer has a good "credit rating".

Preferably, a credit rating in this connection could be determined by the service provider (e.g., a cable "broadcaster" or "cable head-end"). The credit rating would thus be a variable in setting the rules for presentation of the content. It is likely that the presentation controller may not be explicitly aware of a variable known as "credit rating", but would perhaps be aware of certain variables in its rules that permit it to dip below a credit value of zero. The below-zero rules for a particular presentation controller 700 can be downloaded thereto as simple data at any time, along with digital video content.

A consumer who chooses not to view any advertisements may do so, but will pay higher fees. The credits obtained in this manner will be applied along with all other credits obtained by means other than media presentation. They are depicted in this illustration by "other cost factors" 1000.

As a possible working embodiment in accordance with the present invention, a presentation controller 700 may be embodied by a cable set-top box and the presentation medium 800 may be a television. A viewer may earn "credits" towards the capability of viewing "valuable" television shows (e.g., those that correspond to his or her interests, relatively new movies, etc.) by watching commercials. He or she, however, may have the option of bypassing commercials and, instead, paying an extra fee (e.g., as part of a monthly cable bill). Credits and debits will preferably be applied only when content is watched (e.g., when the TV set is on and a show is in progress or when a video is being watched, but not when a VCR is recording a TV show and the TV set is [i.e., live audio and video] is switched off). Preferably, all rules relating to credits and debits will be enforced by the cable provider in this instance, but will be applied by the set-top box.

It should be understood that what is primarily contemplated by the term "VCR" herein is "digital VCR". Assumed, then, in that connection is a digital recording device that would be able to record encoded content but would not be able to decode it. It could be embodied, for example, by a known type of would most likely be a Personal Video Recorder (similar to a "Tivo" or "Replay"), but could be a digital VCR as well. The video content, in any event, will preferably not be decoded until it passes through a decoder in the presentation controller. Thus, through the decoding, credit/debit mechanisms can be applied while previously recorded video content is being watched so that, for instance, if a credit value drops lower than some negative threshold value while the video content is being watched (based perhaps on the attendant "credit rating", the content may terminate or, in the case of content treated as a unit block or "piece", may not even initiate in the first place.

In recapitulation, the present invention, in accordance with at least one presently preferred embodiment, provides a manner of scaling the well-known model of commercial-sponsored media broadcast to the individual customer level while still delivering the media with a broadcast mechanism.

It is to be understood that the present invention, in accordance with at least one presently preferred embodiment, may be utilized in an environment other than television.

It is to be understood that the present invention, in accordance with at least one presently preferred embodiment, includes an interface arrangement which receives media input, a controller which attributes at least one credit value to at least one portion of received media input, and a regulator which regulates the presentation of received media input at a presentation medium based on the at least one credit value attributed to the at least one portion of received media input. Together, these may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for regulating the presentation of electronic media content to a consumer via a presentation medium, said apparatus comprising:
    an interface arrangement which receives media content comprising a plurality of segments, wherein each segment includes cost factor data associated therewith;
    a controller which
        examines said cost factor data,
        attributes credit values to said plurality of segments based on said cost factor data, and maintains a credit balance associated with said consumer based on the attributed values, wherein said controller attributes a positive credit value to received media content construed as credit-bearing content and attributes a negative credit value to received media construed as debit-bearing content, and
        adjusts the attributed credit value of the received media content based on said cost factor data and at least one additional predetermined criterion external to the received media content;
        uses the balance in the account to determine the rules for future behavior of content presentation;
        is programmed with consumer demographic profile and preference information, wherein, based upon the demographic and preference information, a modulated credit value for credit-bearing content is obtained; and
    a regulator which applies rules for presenting the media content based on the credit balance;
    wherein the presentation medium is a television; and wherein the modulated credit value has a higher credit value when the credit-bearing content is being presented to a consumer who is known to be in a demographic group that has a high probability of purchasing a product featured in said credit-bearing content.

2. The apparatus according to claim 1, wherein:
    said controller attributes a credit rating associated with said consumer; and
    said regulator controls the presentation of received media content based on the attributed credit rating.

3. The apparatus according to claim 2, wherein the credit rating represents a threshold value and said regulator ceases the presentation of debit-bearing content upon the threshold value being breached.

4. The apparatus according to claim 1, wherein said controller:
    monitors the presentation of received media content at the presentation medium; and
    adjusts the credit balance based on the presentation of received media content at the presentation medium.

5. The apparatus according to claim 4, wherein said controller subtracts from the credit balance upon debit-bearing content being presented at the presentation medium and add to the credit balance upon credit-bearing content being presented at the presentation medium.

6. The apparatus according to claim 4, wherein:
    the received media content includes pre-recorded media content; and
    said regulator comprises a decoder for decoding the pre-recorded media content, as to permit the presentation of the content, based on the credit balance.

7. The apparatus according to claim 1, wherein said at least one additional predetermined criterion external to the received media content comprises a time-dependent factor, wherein said time-dependent factor decreases a debit value of the received media content upon passage of time.

8. The apparatus according to claim 1, wherein the received media content comprising a plurality of segments comprises a television commercial and at least a portion of a television show; and
   wherein said consumer demographic profile and preference information includes consumer buying habits.

9. The apparatus according to claim 1, wherein said controller comprises a set-top cable TV converter box.

10. The apparatus according to claim 1, wherein the presentation medium is a computer monitor.

11. The apparatus according to claim 10, wherein the received media content includes internet multimedia content.

12. A method of regulating electronic media content to a consumer via a presentation medium, said method comprising the steps of:
   receiving media content comprising a plurality of segments, wherein each segment includes cost factor data associated therewith;
   examining said cost factor data;
   attributing credit values to said plurality of segments based on said cost factor data, wherein a positive credit value is attributed to received media content construed as credit-bearing content and a negative credit value is attributed to received media content construed as debit-bearing content;
   adjusting the attributed credit value of the media content based on said cost factor data and at least one additional predetermined criterion external to the received media content;
   maintaining a credit balance associated with said consumer based on the attributed values;
   using the balance in the account to determine the rules for future behavior of content presentation;
   obtaining a modulated credit value for credit-bearing content based upon consumer demographic and preference information; and
   applying rules for presenting the media content based on the credit balance;
   wherein the presentation medium is a television; and
      wherein the modulated credit value has a higher credit value when the credit-bearing content is being presented to a consumer who is known to be in a demographic group that has a high probability of purchasing a product featured in said credit-bearing content.

13. The method according to claim 12, further comprising the steps of:
   attributing a credit rating associated with said consumer; and
   said regulating step comprising the step of controlling the presentation of received media content based on the attributed credit rating.

14. The method according to claim 13, wherein the credit rating represents a threshold value and said controlling step comprises ceasing the presentation of debit-bearing content upon the threshold value being breached.

15. The method according to claim 12, further comprising the steps of:
   monitoring the presentation of received media content at the presentation medium; and
   adjusting the credit balance based on the presentation of received media content at the presentation medium.

16. The method according to claim 15, further comprising the steps of subtracting from the credit balance upon debit-bearing content being presented at the presentation medium and adding to the credit balance upon credit-bearing content being presented at the presentation medium.

17. The method according to claim 15, wherein:
   the received media content includes pre-recorded media content; and
   said method further comprises the step of decoding the pre-recorded media content, as to permit the presentation of the content, based on the credit balance.

18. The method according to claim 15 wherein said at least one additional predetermined criterion external to the received media content comprises a time-dependent factor, wherein said time-dependent factor decreases a debit value of the received media content upon passage of time.

19. The method according to claim 12, wherein the received media content comprising a plurality of segments comprises a television commercial and at least a portion of a television show; and
   wherein said consumer demographic profile and preference information includes consumer buying habits.

20. The method according to claim 12, wherein the presentation medium is a computer monitor.

21. The method according to claim 20, wherein the received media input includes internet multimedia content.

22. A program storage device readable by machine, tangibly embodying a program of instructions executable by the machine to perform method steps regulating the presentation of electronic media content to a consumer via a presentation medium, said method comprising the steps of:
   receiving media content comprising a plurality of segments, wherein each segment includes cost factor data associated therewith;
   examining said cost factor data;
   attributing credit values to said plurality of segments based on said cost factor data, wherein a positive credit value is attributed to received media content construed as credit-bearing content and a negative credit value is attributed to received media content construed as debit-bearing content;
   adjusting the attributed credit value of the media content based on said cost factor data and at least one additional predetermined criterion external to the received media content;
   maintaining a credit balance associated with said consumer based on the attributed values;
   using the balance in the account to determine the rules for future behavior of content presentation;
   obtaining a modulated credit value for credit-bearing content based upon consumer demographic and preference information; and
   applying rules for presenting the media content based on the credit balance;
   wherein the presentation medium is a television; and
      wherein the modulated credit value has a higher credit value when the credit-bearing content is being presented to a consumer who is known to be in a demographic group that has a high probability of purchasing a product featured in said credit-bearing content.

* * * * *